United States Patent
Lagerstedt et al.

(10) Patent No.: US 7,731,772 B2
(45) Date of Patent: Jun. 8, 2010

(54) ROTOR UNIT OF A CENTRIFUGAL SEPARATOR

(75) Inventors: Torgny Lagerstedt, Stockholm (SE); Claes Inge, Saltsjö-Duynä s (SE); Peter Franzèn, Huddinge (SE); Olev Maehans, Tullinge (SE); Martin Sandgren, Gustavsberg (SE)

(73) Assignee: 3Nine AB, Naeka Strand (SE)

( * ) Notice: Subject to any disclaimer, the term of this patent is extended or adjusted under 35 U.S.C. 154(b) by 650 days.

(21) Appl. No.: 11/629,363

(22) PCT Filed: Jun. 3, 2005

(86) PCT No.: PCT/SE2005/000848

§ 371 (c)(1),
(2), (4) Date: Dec. 12, 2006

(87) PCT Pub. No.: WO2005/123220

PCT Pub. Date: Dec. 29, 2005

(65) Prior Publication Data

US 2008/0308480 A1 Dec. 18, 2008

(51) Int. Cl.
*B01D 45/14* (2006.01)
(52) U.S. Cl. ........................ 55/407; 95/270; 210/512.1; 210/512.3; 210/781
(58) Field of Classification Search ................... 55/400, 55/406, 407; 95/270; 210/225, 512.1, 781, 210/787; 494/31–34, 67–73
See application file for complete search history.

(56) References Cited

U.S. PATENT DOCUMENTS

| | | | |
|---|---|---|---|
| 2,569,567 A | 10/1951 | Korn | |
| 3,234,716 A | * 2/1966 | Sevin et al. | 210/360.1 |
| 4,350,282 A | 9/1982 | Dudrey et al. | |
| 4,698,053 A | * 10/1987 | Stroucken | 494/70 |
| 5,575,912 A | * 11/1996 | Herman et al. | 210/380.1 |

(Continued)

FOREIGN PATENT DOCUMENTS

SE    523672 C2    5/2004

(Continued)

OTHER PUBLICATIONS

"International Search Report for Application No. PCT/SE 2005/000848", 4 Pages.

*Primary Examiner*—Duane Smith
*Assistant Examiner*—Sonji Turner
(74) *Attorney, Agent, or Firm*—Mark P. Stone

(57) ABSTRACT

Rotor unit for a centrifuge for purifying flowing fluids, which rotor unit (12) comprises a plurality of disk elements (14) which are stacked concentrically one on another and provided with at least one centrally located fluid flow-through hole, where the disk elements (14) have lead-through openings by means of which the disk elements (14) are pushed onto a number of essentially axially elongate guide elements (16) distributed in the circumferential direction for guiding the disk elements in the circumferential direction and radially. The disk elements (14) are held together by a first and a second end element (18, 20) at the ends of the stack of disk elements. A central portion of at least some of the guide elements (16) are interconnected by means of a cross-stay construction (36) in order to prevent deflection of the rods owing to the centrifugal force during rotation of the rotor unit (12).

15 Claims, 2 Drawing Sheets

U.S. PATENT DOCUMENTS

| | | | |
|---|---|---|---|
| 5,637,217 A * | 6/1997 | Herman et al. | 210/380.1 |
| 5,746,789 A | 5/1998 | Wright et al. | |
| 5,755,605 A | 5/1998 | Asberg | |
| 5,795,477 A * | 8/1998 | Herman et al. | 210/360.1 |
| 5,851,396 A * | 12/1998 | Saget | 210/512.3 |
| 6,165,365 A * | 12/2000 | Salyer et al. | 210/650 |
| 6,755,896 B2 * | 6/2004 | Szepessy et al. | 95/270 |
| 6,783,571 B2 * | 8/2004 | Ekeroth | 95/8 |
| 6,821,319 B1 * | 11/2004 | Moberg et al. | 95/270 |
| 6,869,469 B2 * | 3/2005 | Grover et al. | 96/417 |
| 6,973,925 B2 * | 12/2005 | Sauter et al. | 123/572 |
| 7,022,150 B2 * | 4/2006 | Borgstrom et al. | 55/338 |
| 7,022,163 B2 * | 4/2006 | Olsson et al. | 95/268 |
| 7,338,546 B2 * | 3/2008 | Eliasson et al. | 55/406 |
| 7,396,373 B2 * | 7/2008 | Lagerstedt et al. | 55/406 |
| 2006/0100083 A1 * | 5/2006 | Lagerstedt et al. | 494/70 |

FOREIGN PATENT DOCUMENTS

| | | |
|---|---|---|
| WO | WO-9627445 A1 | 9/1996 |
| WO | WO 2004020105 A2 * | 3/2004 |

* cited by examiner

ROTOR UNIT OF A CENTRIFUGAL SEPARATOR

RELATED APPLICATIONS

This application is a nationalization under 35 U.S.C. 371 of PCT/SE2005/000848, filed Jun. 3, 2005 and published as WO 2005/123220 A1, on Dec. 29, 2005, which claimed priority under U.S.C. 119 to Sweden Patent Application No. 0401544-2, filed Jun. 16, 2004, which applications and publication are incorporated herein by reference and made a part hereof.

BACKGROUND OF THE INVENTION

1. Technical Field

The present invention relates to a rotor unit for a centrifugal separator for purifying flowing fluids, which rotor unit comprises a plurality of disk elements which are stacked concentrically one on another and provided with at least one centrally located fluid flow-through hole, where the disk elements have lead-through openings by means of which the disk elements are pushed onto essentially axially elongate guide elements distributed in the circumferential direction for guiding the disk elements in the circumferential direction and radially, and where the disk elements are held together by a first and a second end element at the ends of the stack of disk elements, at least some of the guide elements comprising tie rods which are arranged so as to interact with the end elements in such a way that the end elements can be displaced toward one another while the disk elements are pressed together, in addition to which means are arranged so as to engage in a locking way with the tie rods for retaining the disk elements in a pressed-together state with a small gap-forming interspace between the disk elements, the rotor unit being arranged so as to be rotated in a surrounding housing by a motor.

2. Background Art

In centrifugal separators of the abovementioned kind with axially long rotor units, problems of deflection of the central portions of the guide and tie rods can occur during operation as a result of the centrifugal forces acting on them. The deflections are proportional to the length of the rods raised to the fourth power and inversely proportional to the radius raised to the second power. Doubling the length of the rods therefore requires a fourfold greater diameter, which makes the rods 16 times heavier per unit length. In order to increase the flow capacity through the rotor unit, it is usual to increase the diameter of the fluid flow-through hole of the disk elements as well. By virtue of this, the rods have to be moved outward, which means that the centrifugal force on the rods, and thus the deflection problem, increases.

SUMMARY OF THE INVENTION

One object of the present invention is to propose a solution which eliminates the abovementioned problems of known centrifugal separators. To this end, the invention proposes that a central portion of at least some of the guide elements of the rotor unit described in the introduction are interconnected by means of a cross-stay construction in order to prevent deflection of the guide elements owing to the centrifugal force during rotation of the rotor unit. This results in considerable stiffening and stabilization of the whole rotor unit as the deflection of the rods is reduced to a negligible level.

Suitable embodiments of the rotor unit according to the invention are defined in the dependent patent claims which follow.

The invention is described in greater detail below with reference to accompanying drawings.

DETAILED DESCRIPTION OF PREFERRED EMBODIMENT

Figure 1:
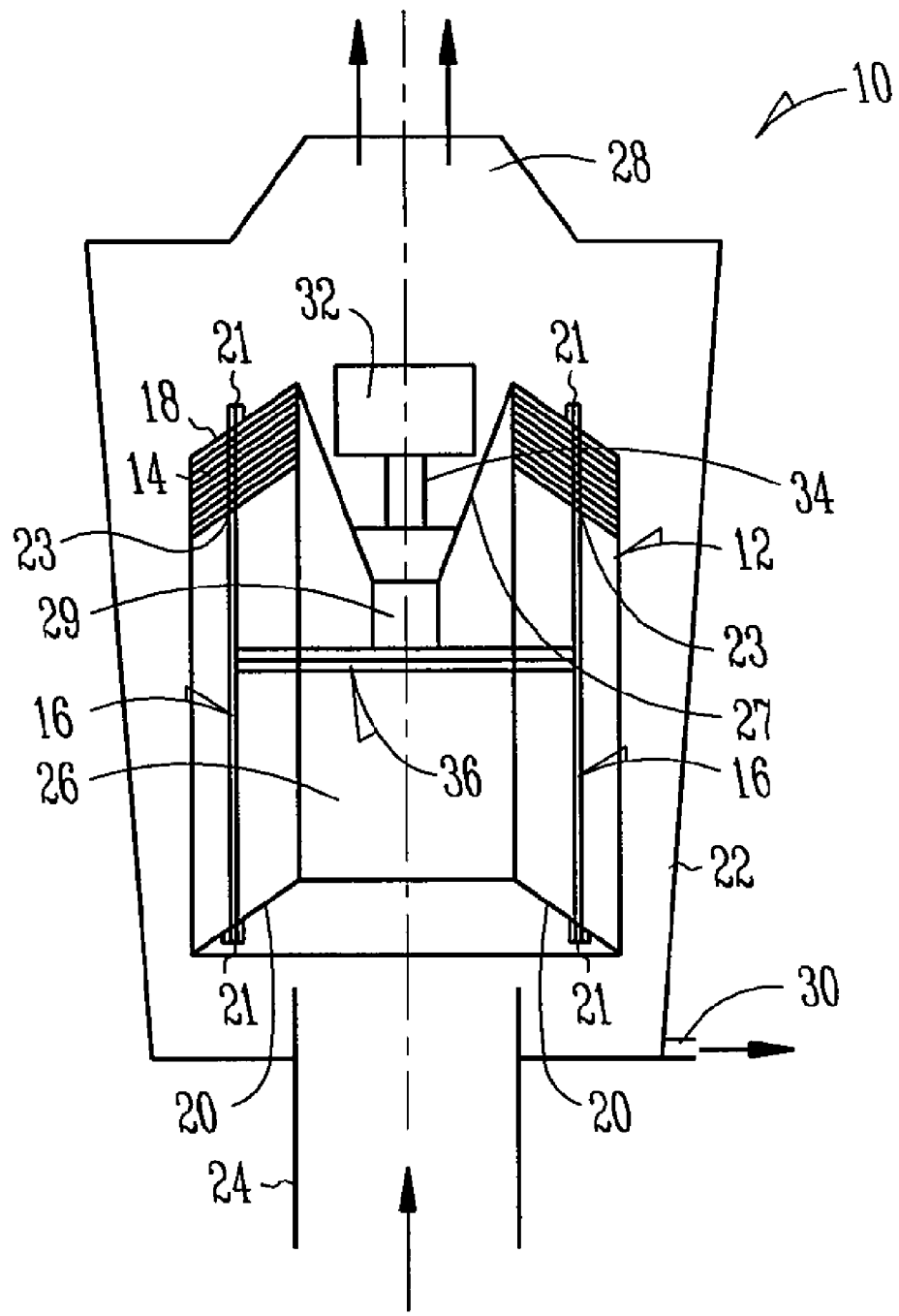
FIG. 1 is a diagrammatic side view of a centrifugal separator with a rotor unit according to the present invention.

In FIG. 1, reference number 10 designates generally a centrifugal separator with a rotor unit 12 according to the invention for separating solid and/or liquid particles suspended in gaseous media, for example for purifying air which contains an oil mist or other very fine particles. The rotor unit 12 comprises a plurality of sedimentation means in the form of insert plates 14 with a central hole and preferably has a vertically oriented axis of rotation. The insert plates 14, on which solid and/or liquid particles suspended in the gas are to be deposited by sedimentation, can be in the form shown diagrammatically in FIG. 1, namely conical disk elements stacked one on another, separated by a small spacing axially. The disk elements 14 have lead-through openings 23, by means of which the disk elements 14 are pushed onto four essentially axially elongate guide elements 16 (FIGS. 2 and 3) preferably evenly distributed in the circumferential direction for guiding the disk elements in the circumferential direction and radially. The number of guide elements 16 can of course be greater, but there must be at least three. The disk elements 14 are held together by an upper and a lower end element 18, 20 at respective ends of the stack of disk elements. The guide elements 16 can be designed as or contain tie rods, which are arranged so as to interact with the end elements 18, 20 in such a way that the end elements 18, 20 can be displaced toward one another, while the intermediate disk elements 14 are pressed together, and can be fixed by means of suitable locking means 21, such as screws/nuts. A stationary, conically shaped housing 22 surrounds the rotor unit 12 and has an intake 24 for the gas to be purified. The intake 24 lies directly in front of a central inlet shaft 26 of the rotor unit 12. The housing 22 has an outlet 28 located at the top for purified gas and also an outlet 30 located at the bottom for the solid and/or liquid particles which have first been deposited on the disk elements 14 and then been transferred onto the inside of the housing 22 by a centrifugal force.

The rotor unit 12 is driven by a motor 32 via a drive shaft 34. The motor 32 can, in a way not shown in greater detail, be suspended firmly within an upper part of the central shaft 26 formed by the holes in the conical disks 14 and be separated from a part of the central shaft 26 through which fluid flows by means of a surrounding cover 27. The rotation of the drive shaft 34 can be transmitted to the rotor unit 12 via this cover 27 and the upper end element 18.

According to the invention, a cross-stay construction 36, which interconnects a central portion of the guide elements 16, is arranged within the rotor unit 12. According to FIG. 1, a central, axial extension 29 of the cover 27 can extend into a center portion of the cross-stay construction 36 in order to center the latter in the rotor unit 12. By virtue of this, positional fixing of the central portion of the guide elements 16 is brought about, so that deflection of these is minimized during operation of the centrifugal separator. In this connection, "central portion" does not mean merely the ideal, exact central point between the end elements 18, 20, but the interconnection between the cross-stay construction 36 and the guide elements 16 can take place generally on an intermediate section of the elements in order to reduce deflection of the same, so that it becomes negligibly small in the application concerned.

Figure 2:
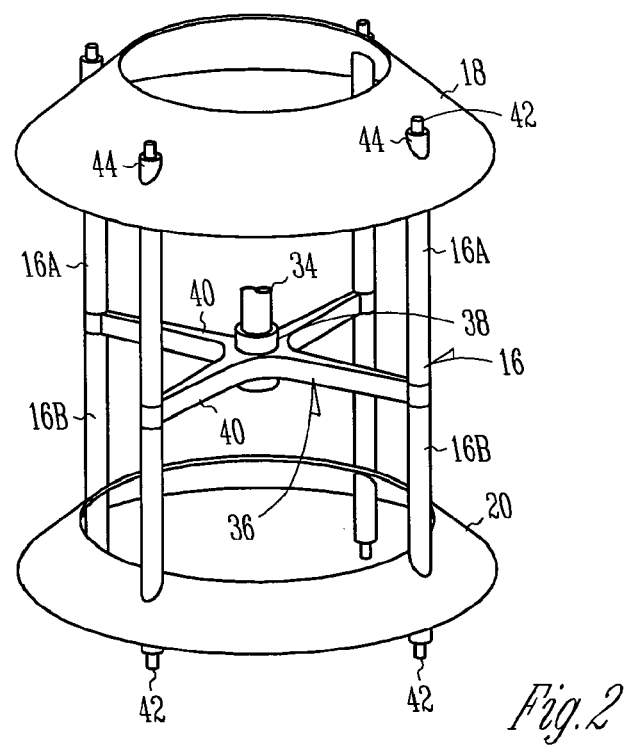
FIG. 2 is a perspective view of a rotor unit according to the invention in which the conical insert elements are removed in order to show clearly the cross-stay construction between the central portions of the guide elements of the rotor.

As shown in greater detail in FIG. 2, the cross-stay construction 36 can alternatively be connected to the drive shaft 34 via a hub portion 38, from which at least two, but suitably four (or more), radial arms 40 distributed in the circumferential direction project, the outer ends of which are connected to the central portion of the guide elements 16 in a suitable way, the rotation of the rotor unit 12 therefore taking place via the cross-stay construction 36.

Figure 3:
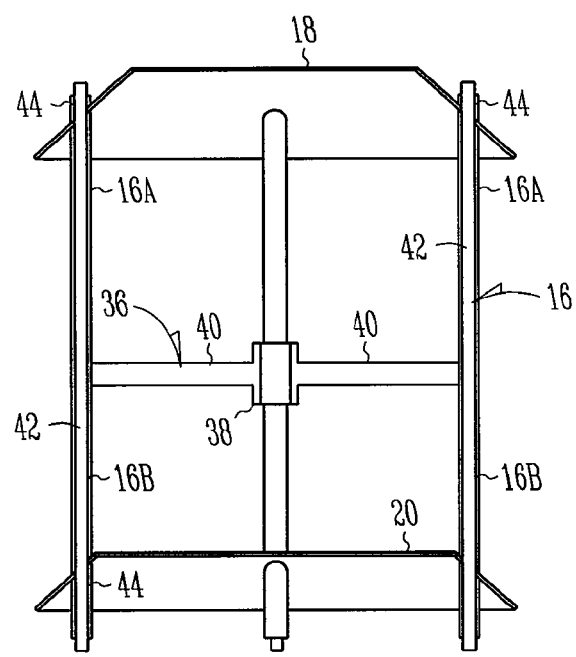
FIG. 3 is a side view of the frame of the rotor unit according to the invention without insert elements and drive arrangement, where the guide elements for the insert elements are designed as two-piece tubular elements which are fitted on axial pins on the radially outer ends of the arms of the cross-stay construction.

As shown in FIG. 3, the guide elements 16 can each comprise an upper and a lower tubular distance element 16a and 16b respectively, the upper distance element 16a bearing at its one end against the inside of the upper end element 18 and at its other end against the upper side of the radially outer end of a respective arm 40, while the lower distance element 16b bears at its one end against the inside of the second end element 20 and at its other end against the lower side of the outer end of said respective arm 40. A tie rod 42 extends through the end elements 18, 20, the tubular distance elements 16a, 16b and a hole at the outer end of the respective arm 40. By means of nuts (not shown) and spacer sleeves 44 on the outside of the upper and lower end elements 18, 20, the stack of conical sedimentation disks 14 located between the end elements 18, 20 can be clamped firmly by the tie rods 42. In addition to forming distance elements between the arms 40 and the end elements 18, 20, the tubular elements 16a, 16b also form guide elements for the conical disks 14. When a large number of guide elements 16 is used, not all the elements 16 have to include a respective tie rod 42, but it is sufficient for at least three of the guide elements 16 to be equipped with tie rods.

As the drive transmission from the motor 32 to the rotor unit 12 in this embodiment takes place directly from the motor drive shaft 34 to the central portion of the guide elements 16, not only is undesirable deflection of the guide elements 16 prevented, but the one end element which was previously designed in a costly way so as to be capable of permitting this drive transmission between drive shaft and rotor unit can now for example be designed as a simple spun conical disk like the other end element.

The invention claimed is:

1. A rotor unit for a centrifuge for purifying flowing fluids, comprising:
    a plurality of disk elements which are stacked concentrically one on another and provided with at least one centrally located fluid flow-through hole, wherein the disk elements have lead-through openings by means of which the disk elements are pushed onto a number of essentially axially elongate guide elements distributed in the circumferential direction for guiding the disk elements in the circumferential direction and radially, and wherein the disk elements are held together by a first and a second end element at the ends of the stack of disk elements, at least some of the guide elements comprising tie rods which are arranged so as to interact with the end elements in such a way that the end elements can be displaced toward one another while the disk elements are pressed together, in addition to which means are arranged so as to engage in a locking way with the tie rods for retaining the disk elements in a pressed-together state with a small gap-forming interspace between the disk elements, the rotor unit being arranged so as to be rotated in a surrounding housing by a motor and wherein a central portion of at least some of the guide elements are interconnected by means of a cross-stay construction in order to prevent deflection of the guide elements owing to the centrifugal force during rotation of the rotor unit, said disk elements and said guide elements being rotatable together.

2. The rotor unit as claimed in claim 1, wherein the cross-stay construction is in the form of arms lying in a radial plane through the rotor unit and distributed in the circumferential direction, the radially inner ends of which are connected to a common center hub and the radially outer ends of which are coupled to the central portion of at least three of the guide elements between the end elements.

3. The rotor unit as claimed in claim 1, wherein the rotor unit is drivably connected to a drive shaft, which is located concentrically in the rotor unit and connected to the motor, via the cross-stay construction.

4. The rotor unit as claimed in claim 2, wherein at least some of the guide elements include a first rod section of the guide elements being connected at its one end to the first end element and at its other end to the radially outer end of a respective arm of the cross-stay construction, while the second rod section is at its one end connected to the second end element and at its other end to the outer end of said respective arm, the rod sections constituting distance elements between the arms and the respective end element.

5. The rotor unit as claimed in claim 1, wherein the guide elements are tubular distance elements.

6. The rotor unit as claimed in claim 5, wherein a respective tie rod, which extends through the end elements, the tubular distance element and the outer end of an associated arm, is coordinated with at least three guide elements.

7. The rotor unit as claimed in claim 1, wherein the cross-stay construction is in the form of a spider.

8. The rotor unit as claimed in claim 1, wherein the motor and the drive shaft are essentially located within a central shaft of the rotor unit which is delimited by the central fluid flow-through holes of the disk elements.

9. The rotor unit as claimed in claim 8, wherein the motor is separated from a part of the central shaft through which fluid flows by means of a surrounding cover.

10. The rotor unit as claimed in claim 2, wherein the rotor unit is drivably connected to a drive shaft that is located concentrically in the rotor unit and connected to the motor via the cross-stay construction.

11. The rotor unit as claimed in claim 10, wherein at least some of the guide elements include a first rod section and a second rod section, the first rod section being connected at its one end to the first end element and at its other end to the radially outer end of a respective arm of the cross-stay construction, the second rod section is at its one end connected to the second end element and at its other end to the outer end of said respective arm, the first and second rod sections comprising distance elements between the arms and the respective end element.

12. The rotor unit as claimed in claim 11, wherein the guide elements include tubular elements.

13. The rotor unit as claimed in claim 12, wherein a respective tie rod, which extends through the end elements, the tubular rod sections and the outer end of an associated arm, is coordinated with at least three guide elements.

14. The rotor unit as claimed in claim 13, wherein the cross-stay construction is in the form of a spider.

15. A rotor unit for a centrifuge for purifying flowing fluids, comprising:
   a plurality of disk elements that are stacked concentrically one on another and provided with at least one centrally located fluid flow-through hole, the disk elements including lead-through openings;
   a number of essentially axially elongate guide elements extending into the lead-through openings of the disk elements, the guide elements to guide the disk elements in the circumferential direction and radially;
   a first end element and a second end element engaging ends of the disk elements to hold the disk elements together;
   wherein at least some of the guide elements comprises tie rods which are arranged so as to interact with the first and second end elements such that respective ones of the first and second end elements can be displaced toward one another with the disk elements being pressed together;
   a lock engaging the tie rods to retain the disk elements in a pressed-together state with a small gap-forming interspace between the disk elements, and
   a cross-stay to interconnect a central portion of at least some of the guide elements to prevent deflection of the guide elements owing to the centrifugal force during rotation of the rotor unit,
   said disk elements and said guide elements being rotatable together.

* * * * *